US012716838B2

(12) United States Patent
Plechinger et al.

(10) Patent No.: US 12,716,838 B2
(45) Date of Patent: Aug. 25, 2026

(54) OPTOELECTRONIC DEVICE AND A METHOD FOR DETERMINING THE DISTRIBUTION OF A SUBSTANCE IN A SAMPLE

(71) Applicant: ams-OSRAM International GmbH, Regensburg (DE)

(72) Inventors: Gerd Plechinger, Saal an der Donau (DE); Norwin Von Malm, Thumhausen/Nittendorf (DE); Laura Kreiner, Regensburg (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 577 days.

(21) Appl. No.: 17/908,960

(22) PCT Filed: Feb. 18, 2021

(86) PCT No.: PCT/EP2021/054007
§ 371 (c)(1),
(2) Date: Sep. 2, 2022

(87) PCT Pub. No.: WO2021/175607
PCT Pub. Date: Sep. 10, 2021

(65) Prior Publication Data

US 2023/0096718 A1 Mar. 30, 2023

(30) Foreign Application Priority Data

Mar. 5, 2020 (DE) ..................... 10 2020 202 823.0

(51) Int. Cl.
*G01N 21/47* (2006.01)
*G01N 21/01* (2006.01)
*G01N 21/31* (2006.01)

(52) U.S. Cl.
CPC ..... *G01N 21/4795* (2013.01); *G01N 21/3103* (2013.01); *G01N 2021/0112* (2013.01); *G01N 2021/4735* (2013.01)

(58) Field of Classification Search
CPC ....... G02B 5/201; F21V 5/007; G06V 10/143; G06V 10/147; G06V 10/16;
(Continued)

(56) References Cited

U.S. PATENT DOCUMENTS 8,124,439 B2 * 2/2012 Bolis ................ H01L 27/14685 438/65
2007/0235632 A1 * 10/2007 Bin Marzuki ............ H03F 3/08 250/214 A (Continued)

FOREIGN PATENT DOCUMENTS

CN 107003391 A 8/2017
CN 107367720 A 11/2017

(Continued)

OTHER PUBLICATIONS

Nevalainen, O. et al., “Fast and nondestructive method for leaf level chlorophyll estimation using hyperspectral LiDAR”, Agricultural and Forest Meteorology, Sep. 18, 2014, pp. 250-258, vols. 198-199, Elsevier.

(Continued)

*Primary Examiner* — Michelle M Iacoletti
*Assistant Examiner* — Maher Yazback
(74) *Attorney, Agent, or Firm* — VIERING, JENTSCHURA & PARTNER mbB

(57) ABSTRACT

An optoelectronic device may include an arrangement having a plurality of emitter elements configured to sequentially emit light of different wavelength ranges. The arrangement may include a plurality of time-of-flight detector elements configured to detect the light emitted by the emitter elements
(Continued)

and reflected at a sample and to carry out a measurement for determining the distance of the reflection point of the light at the sample from the respective time-of-flight detector element. The device further includes an evaluation unit configured to generate a three-dimensional image of the sample for each wavelength range emitted by the emitter elements on the basis of the light detected by the time-of-flight detector elements and the distance of the reflection point of the light from the respective time-of-flight detector element and to determine the distribution of a substance in the sample from the images.

20 Claims, 5 Drawing Sheets

(58) Field of Classification Search
CPC .......... G02F 2203/055; G01N 21/3103; G01N 2201/0221; G01S 17/894; G01S 17/89; G01S 17/36; G01S 17/32; G01J 3/10; G01J 3/2803; G01J 3/32; G01J 2003/2826; G01J 3/108; G01J 3/28; G01J 3/2823; G06T 2207/10028; G06T 2207/10048; H04N 23/55; H04N 23/60; H04N 23/74; H04N 23/50; H04N 23/56; H04N 23/11
See application file for complete search history.

(56) References Cited

U.S. PATENT DOCUMENTS

2009/0295910 A1* 12/2009 Mir .................... G01N 21/31 348/61
2011/0101239 A1* 5/2011 Woodhouse .......... G01S 7/4802 356/51
2012/0307056 A1* 12/2012 Zuzak .................... G01N 21/31 250/459.1
2016/0146927 A1 5/2016 Hudman
2016/0187199 A1* 6/2016 Brunk .................. G01J 3/0208 348/89
2017/0059408 A1* 3/2017 Körner .................. G01J 3/0229
2017/0257617 A1 9/2017 Retterath
2017/0285148 A1 10/2017 Hipp
2018/0059218 A1* 3/2018 Buettgen ................ G01S 7/497
2018/0153410 A1 6/2018 Islam
2019/0349536 A1* 11/2019 Ortiz Egea ............ G01S 17/89
2020/0264281 A1* 8/2020 Wei ........................ G01S 17/89
2021/0135023 A1 5/2021 Münzer et al.
2021/0263155 A1* 8/2021 Miller ............... H01L 27/14643
2023/0078421 A1* 3/2023 Han ........................ G01S 17/10 348/135

FOREIGN PATENT DOCUMENTS

DE 102016000415 A1 7/2017
DE 112017001112 T5 11/2018
KR 101557295 B1 * 10/2015 .............. G02B 7/09
KR 20160006917 A 1/2016
TW 201913139 A 4/2019
WO WO-2017006314 A1 * 1/2017 ....... G06K 19/06028

OTHER PUBLICATIONS

International Search Report issued for the corresponding international patent application No. PCT/EP2021/054007, dated Jun. 7, 2021, 5 pages (for informational purposes only).
German Search Report issued for the corresponding German patent application No. 10 2020 202 823.0, dated Sep. 24, 2020, 7 pages (for informational purposes only).
Chinese office action with search report issued for the corresponding Chinese patent application No. 202180018624.4, dated Apr. 25, 2025, 9 pages (for informational purposes only).
Gao et al., "Design of Photovoltaic Instrument", National Defense Industry Press, 2012, pp. 323-326, with English Machine Translation.
Chinese Office Action issued for the corresponding CN patent application No. CN 2021800186244, dated Sep. 24, 2025, 19 pages (For informational purposes only).

* cited by examiner

OPTOELECTRONIC DEVICE AND A METHOD FOR DETERMINING THE DISTRIBUTION OF A SUBSTANCE IN A SAMPLE

CROSS-REFERENCE TO RELATED APPLICATIONS

The present application is a national stage entry according to 35 U.S.C. § 371 of PCT application No.: PCT/EP2021/054007 filed on Feb. 18, 2021; which claims priority to German patent application DE 10 2020 202 823.0, filed on Mar. 5, 2020; all of which are incorporated herein by reference in their entirety and for all purposes.

TECHNICAL FIELD

The present disclosure relates to an optoelectronic device and a method for determining the distribution of a substance in a sample. Further, the present disclosure relates to an optoelectronic device for hyperspectral analysis of a sample.

BACKGROUND

Infrared spectroscopy can be used to investigate the constituents of a sample. However, known methods for infrared spectroscopy do not provide spatial information about the distribution of a constituent over the sample.

SUMMARY

It is an objective to provide an optoelectronic device which makes it possible to determine the distribution of a substance at different positions in a sample. Furthermore, a corresponding method for determining the distribution of a substance in a sample is to be disclosed.

It is an objective to provide an optoelectronic device which, in the form of a very compact component, enables high-resolution 2D grayscale images of a sample to be recorded for several different wavelength ranges emitted onto the sample.

An optoelectronic device includes an arrangement comprising a plurality of emitter elements, an arrangement comprising a plurality of time-of-flight detector elements, and an evaluation unit.

The plurality of emitter elements are configured to sequentially emit light or electromagnetic radiation of different wavelength ranges. For example, it may be provided that exactly one or more of the emitter elements emit light in a first wavelength range and exactly one or more of the remaining emitter elements emit light in a second wavelength range. This can be continued accordingly. In particular, the emission of light of different wavelength ranges does not occur overlapping in time, but one after the other. Between the emission of light of different wavelength ranges, a pause can be provided in each case during which no light is emitted. The plurality of emitter elements can, for example, be arranged in an array, i.e. a regular arrangement.

The light emitted from the emitter elements is used to irradiate a sample arranged such that a portion of the light is reflected from the sample to the time-of-flight detector elements.

The time-of-flight detector elements are configured to detect light emitted by the emitter elements and reflected from the sample. In particular, each of the time-of-flight detector elements is capable of measuring the intensity of the reflected light incident on the respective time-of-flight detector element. Further, each of the time-of-flight detector elements is configured to perform a measurement to determine the distance between the point of reflection of the light from the sample and the respective time-of-flight detector element.

Time-of-flight methods, also called runtime methods, are used to measure distances. In the present application, the time-of-flight of the light can be used to determine the distance from the reflection point on the sample to the respective time-of-flight detector element. The working principle of the time-of-flight detector elements may be, for example, to determine the phase difference between emitted and reflected light. Due to the plurality of time-of-flight detector elements used, a spatially three-dimensional image or reflection image of the sample can be generated. Conventional time-of-flight detectors that can be used in the optoelectronic device include CMOS elements with 2-tap or 4-tap functionality. The time-of-flight detector elements may be arranged in an array. Further, the time-of-flight detector elements may be, for example, the pixels of a time-of-flight camera chip.

The time-of-flight detector elements do not have to be able to automatically determine the distance from the reflection point to the respective time-of-flight detector element. The time-of-flight detector elements can provide measurement results from which the respective distance can be determined. For example, the evaluation unit can be configured to determine the various distances of the reflection points on the sample to the time-of-flight detector elements from the measurement data provided by the time-of-flight detector elements. In particular, the distance of the emitter elements from the sample may be known.

The evaluation unit receives information about the light detected by the respective time-of-flight detector elements for each wavelength range emitted by the emitter elements. For example, the evaluation unit can obtain information about the intensity of the detected light. Furthermore, for each wavelength range emitted by the emitter elements, the evaluation unit determines the distance of the respective time-of-flight detector element to the reflection point of the light on the sample. From this data, the evaluation unit generates a spatially three-dimensional image of the sample for each wavelength range emitted by the emitter elements.

From the multiple three-dimensional reflection images of the sample generated for different wavelength ranges, the evaluation unit can determine the distribution of a substance in the sample. In particular, the evaluation unit can generate a three-dimensional map or representation showing the occurrence or concentration of the substance at different positions in the sample.

With the described technique, three-dimensional maps of the distribution of not only one, but several ingredients of the sample can be generated.

Provided that light of certain wavelengths is not reflected at the surface of the sample, but only deeper within the sample, for example because the outer layers of the sample are transparent to this radiation, tomographic images of the sample can be generated.

The emitter elements can, for example, be light-emitting diodes (LEDs), in particular LED chips or monolithic LEDs with separately controllable segments. VCSELs (vertical-cavity surface-emitting lasers), in particular VCSEL chips, are suitable for particularly good depth resolution because they have very fast switching times in the nanosecond range.

The light emitted by the emitter elements can be, for example, light in the visible range, ultraviolet (UV) light and/or infrared (IR) light. For the application described here, light from the near-infrared spectral range with wavelengths especially in the range of 780 nm to 3 μm is advantageous.

The wavelength ranges that the emitter elements emit sequentially may each extend over suitable wavelengths. It may also be provided that at least some or all of the wavelength ranges are relatively small and contain substantially only one wavelength. For example, the emitter elements may sequentially emit light at wavelengths of 750 nm, 800 nm, 850 nm, and 900 nm or other wavelengths.

The optoelectronic device according to the first aspect of the application can be used, for example, in mobile applications, in particular in portable devices. The optoelectronic device is particularly suitable for determining the ingredients of foodstuffs.

The optoelectronic device can comprise a memory unit to which the evaluation unit has access and in which at least a portion of the absorption spectrum of the substance to be examined is stored. The evaluation unit can determine the distribution of the substance in the sample from the three-dimensional images taken for the various wavelength ranges, using the at least portion of the absorption spectrum.

The absorption spectrum stored in the memory unit can extend over a certain wavelength range, for example over the infrared or near-infrared spectral range. Further, the stored absorption spectrum may include at least those wavelengths at which the substance exhibits high or maximum light absorption. In the wavelength range(s) where the absorption is high, little light is reflected, while in the remaining wavelength range(s) much light is reflected. By evaluating the reflected light, conclusions can be drawn about the presence or concentration of the substance under investigation at various locations in the sample.

The arrangement comprising the plurality of emitter elements may be arranged in a first cavity of the optoelectronic device, while the arrangement comprising the plurality of time-of-flight detector elements is arranged in a second cavity of the optoelectronic device. The first cavity and the second cavity may be adjacent.

The optoelectronic device according to the first aspect may comprise a control unit for controlling the emitter elements and the time-of-flight detector elements, and for time-coordinating the emitter elements and the time-of-flight detector elements.

Furthermore, the control unit can be integrated together with the evaluation unit in a common component. For example, the control unit and the evaluation unit can be integrated together in an integrated circuit (IC). The emitter elements can be arranged on the integrated circuit.

At least one optical lens can be arranged between the sample and the time-of-flight detector elements to focus the light reflected from the sample onto the detector elements and obtain a sharp image of the sample. Without a sharp image of the sample, the two-dimensional spatial information would be lost. For example, the optical lens may be exactly one camera lens, or an array of optical lenses may be provided, each of the optical lenses being associated with a time-of-flight detector element.

A method according to a second aspect of the present application is for determining the distribution of a substance in a sample. According to the method, emitter elements of an arrangement comprising a plurality of emitter elements sequentially emit light of different wavelength ranges. The light emitted by the emitter elements is reflected from a sample, and time-of-flight detector elements of an arrangement comprising a plurality of time-of-flight detector elements detect the light reflected from the sample. Further, the time-of-flight detector elements each perform a measurement to determine the distance of the reflection point of the light on the sample from the respective time-of-flight detector element. For each wavelength range emitted by the emitter elements, a three-dimensional image of the sample is generated based on the light detected by the time-of-flight detector elements and the distance of the reflection point of the light from the respective time-of-flight detector element. From the reflection images for the different wavelength ranges, the distribution of a substance in the sample is determined.

The method for determining the distribution of a substance in a sample according to the second aspect of the application may comprise the above-described embodiments of the optoelectronic device according to the first aspect of the application.

Individual aspects and features of the foregoing embodiments and examples may be readily combined with each other without affecting the principle of the invention. Furthermore, aspects and features of the preceding embodiments and examples may be combined with the further optoelectronic device now described without thereby impairing the principle according to the invention. This includes, among other things, the type and design of the arrangement of the plurality of emitter elements or the emitter elements themselves, the control unit and the evaluation unit, the first cavity and the second cavity, and the type and design of the at least one optical lens.

An optoelectronic device according to a second aspect of the present application comprises an arrangement with a plurality of emitter elements, an arrangement, with a plurality of detector elements, in particular a camera with a plurality of pixels, and an evaluation unit.

The plurality of emitter elements are configured to sequentially emit light or electromagnetic radiation of different wavelength ranges. For example, it may be provided that exactly one or more of the emitter elements emit light in a first wavelength range and exactly one or more of the remaining emitter elements emit light in a second wavelength range. This can be continued accordingly. The wavelength ranges may also partially overlap spectrally. In particular, the emission of light of different wavelength ranges does not take place overlapping in time, but one after the other. Between the radiation of light of different wavelength ranges, a pause can be provided in each case during which no light radiation takes place. The plurality of emitter elements can, for example, be arranged in an array, i.e., a regular arrangement. In particular, the emitter elements may be arranged on a driving device, e.g., a CMOS chip, so that each of the emitter elements is uniquely electrically and mechanically connected to a driving circuit. By the fact that the several emitter elements emit light or electromagnetic radiation of different wavelength ranges one after the other and thus are operated in a pulsed mode, so to speak, the influence of disturbing ambient light on the optoelectronic device can be reduced.

The light emitted from the emitter elements is used to irradiate a sample arranged such that a portion of the light is reflected from the sample to the plurality of detector elements.

The detector elements are configured to detect the light emitted by the emitter elements and reflected by the sample. In particular, each of the detector elements can measure the intensity of the reflected light incident on the respective detector element. For example, the arrangement of the plurality of detector elements may be formed by a camera component having a plurality of pixels (detector elements) arranged to detect electromagnetic radiation. In particular, the detector elements may be configured to detect electromagnetic radiation over the entire spectral range. This can be advantageous in particular because the individual detector elements do not have to be able to resolve spectrally and thus manufacturing costs can be saved. Furthermore, smaller detector elements with a lower resolution can be used, since the entire detection range of the detector elements is used and this does not have to be limited by further processing of the chip.

The evaluation unit receives information about the light detected by each of the detector elements for each wavelength range emitted by the emitter elements. For example, the evaluation unit can receive information about the intensity of the detected light.

For example, from the multiple reflectance images of the sample generated for different wavelength ranges, the evaluation unit can determine the distribution of a substance in the sample. In particular, the evaluation unit can generate a two-dimensional overall image of the sample, which shows the occurrence or concentration of a substance at different positions of the sample. The overall image comprises several image points, each of which comprises a superposition of the light of the different wavelength ranges reflected from the sample and detected by the detector elements.

With the described technique, two-dimensional overall images of the distribution of not only one, but several ingredients of the sample can be created.

In some embodiments, a detector element is associated with each image point of the overall image and the overall image contains a superposition of all wavelength regions detected by that detector element in that image point.

In some embodiments, the arrangement with the plurality of emitter elements and the arrangement with the plurality of detector elements are arranged in a common housing. In this regard, the arrangement with the plurality of emitter elements is arranged in a first cavity in the housing and the arrangement with the plurality of detector elements is arranged in a second cavity in the housing.

In some embodiments, the first and second cavities are optically separated from each other by means of a partition wall. The partition wall can be of the same material as the housing. In particular, the partition wall can optically separate an emission area and a detection area of the optoelectronic device from each other.

In some embodiments, the optoelectronic device is in the form of a leadframe or ceramic package. In this regard, the package or the sidewalls of the package and the partition wall may be formed from a polymer such as an epoxy. In particular, the housing or the sidewalls of the housing and the partition wall may be formed from an epoxy potting material comprising, for example, a polymer matrix (epoxy resins, hardeners and accelerators) and optionally comprising fillers and/or reinforcing materials and/or pigments and/or release agents. The support of the leadframe or ceramic package may be formed, in particular, by a leadframe or a ceramic support from which the side walls of the housing and the partition wall extend upwardly. The sidewalls of the package and the partition wall may form the two cavities in which the arrangement with the plurality of emitter elements and the arrangement with the plurality of detector elements are arranged.

In some embodiments, the optoelectronic device is in the form of a chip-size package. In particular, this can mean that the optoelectronic device comprises a housing with a footprint that is no more than 20% larger than that of the emitter elements, detector elements and possibly the evaluation unit arranged in the housing. The electrical connections of the optoelectronic device can be located in particular on a bottom side of the housing, so that the optoelectronic device is suitable for SMD assembly, for example.

In some embodiments, one or more optical lenses are arranged in front of the plurality of detector elements and/or in front of the plurality of emitter elements. For example, an optical lens in front of the plurality of emitter elements may be configured to project the light emitted from the emitter elements onto a sample to be examined, whereas an optical lens in front of the plurality of detector elements may be configured to image the image of the sample to be examined, in particular the light reflected from the sample to be examined, onto the detector elements. The lenses may be refractive or diffractive, in particular they may be flat metal lenses. In a particular embodiment, the housing serves not only to mechanically and electrically accommodate the emitter and detector elements and the drive and readout device, but also to mechanically attach the optical lenses on the emission and detection side.

In some embodiments, the plurality of emitter elements emit light in the infrared spectral range. However, the multiple emitter elements may also emit light in the UV to mid-infrared range.

In some embodiments, the plurality of emitter elements emit broadband light. A wavelength filter can be arranged above the individual emitter elements or above at least some of the emitter elements. The wavelength filters are arranged above the emitter elements such that the emitter elements emit light or electromagnetic radiation of different wavelength ranges to the outside.

In some embodiments, at least two emitter elements of the plurality of emitter elements emit light at the same wavelength. Further, multiple segments comprising at least two emitter elements may also emit light at the same wavelength. Similarly, it is conceivable that at least two emitter elements of the plurality of emitter elements may emit light of a particular wavelength. This may be advantageous, for example, in order to compensate for a low efficiency of the emitter or detector elements in a certain wavelength range, or to increase the efficiency of the optoelectronic device if certain wavelength ranges are particularly relevant for the use of the optoelectronic device.

In some embodiments, a converter element for converting the light emitted by the emitter element is arranged above at least one of the at least two emitter elements that emit light at the same wavelength. Further, all of the emitter elements may also emit light with the same wavelength, and a converter element for converting the light emitted from the respective emitter element is arranged above at least some of the emitter elements. The converter elements are arranged above the emitter elements in such a way that these emit light or electromagnetic radiation of different wavelength ranges to the outside.

In some embodiments, electrical connections for the arrangement of the plurality of emitter elements and the arrangement of the plurality of detector elements are formed on a bottom surface of the optoelectronic device. This allows the optoelectronic device to be surface mountable and to be small in size, for example.

In some embodiments, the optoelectronic device comprises a control unit for controlling the emitter elements and/or for controlling the detector elements. The control unit may be configured to include a pixelated driver circuit, and to control each emitter element individually via a unique connection. The control unit can further be configured in such a way that it comprises a further pixelated driver circuit and that it can control each detector element individually via a unique connection.

In some embodiments, the evaluation unit and/or the control unit is integrated into a common housing of the optoelectronic device.

BRIEF DESCRIPTION OF THE DRAWINGS

In the following, non-limiting embodiments are explained in more detail with reference to the accompanying drawings. In these schematically show.

In the following detailed description, reference is made to the accompanying drawings, which form a part of this description and in which non-limiting embodiments may be practiced are shown for illustrative purposes. Since components of embodiments may be positioned in a number of different orientations, the directional terminology is for illustrative purposes and is not limiting in any way. It is understood that other embodiments may be used and structural or logical changes may be made without departing from the scope of protection. It is understood that the features of the various embodiments described herein may be combined with each other, unless specifically indicated otherwise. Therefore, the following detailed description is not to be construed in a limiting sense. In the figures, identical or similar elements are provided with identical reference signs where appropriate.

DETAILED DESCRIPTION

Figure 1A:
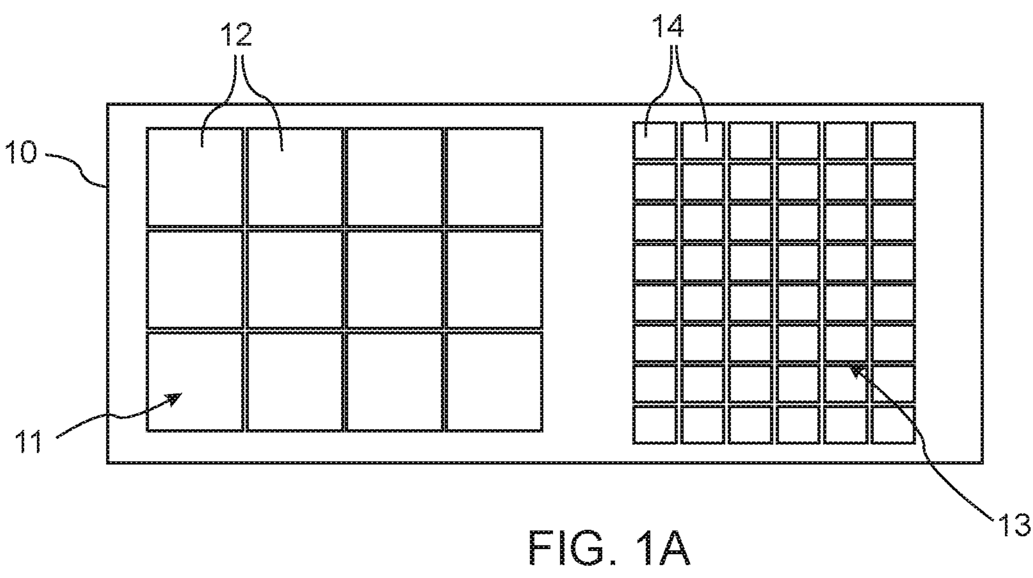
FIG. 1A an illustration of an embodiment of an optoelectronic device in a top view.
Figure 1B:
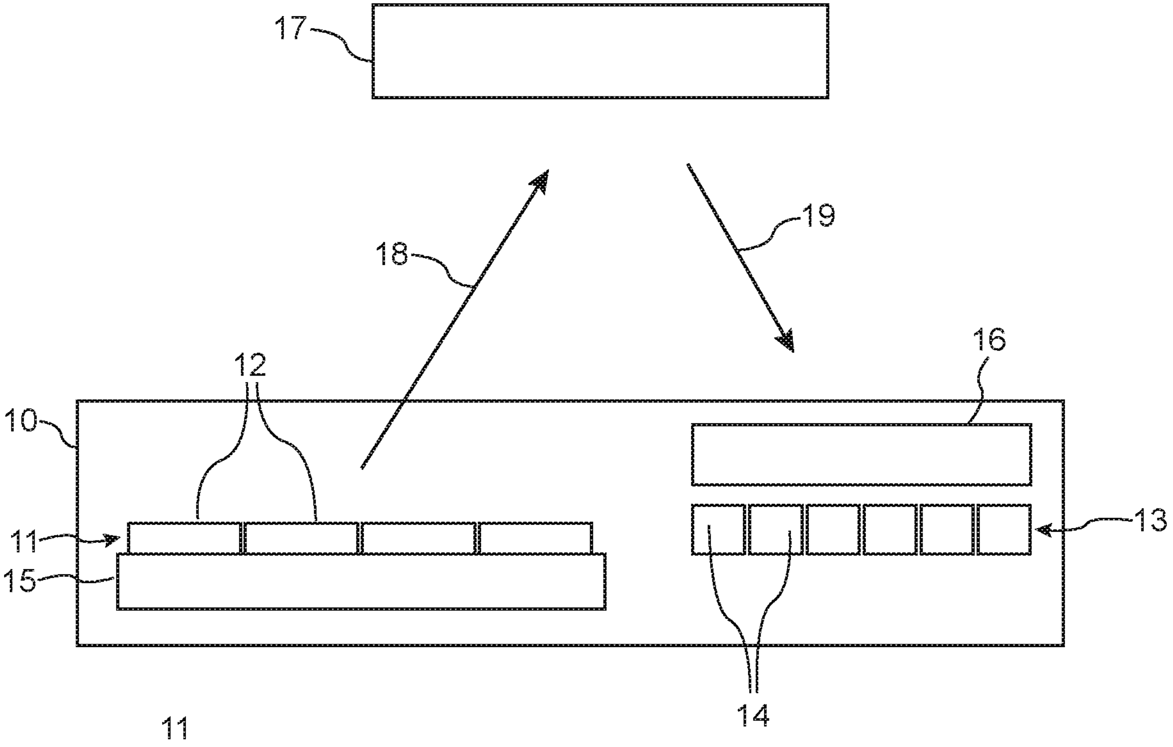
FIG. 1B a side view of the optoelectronic device of FIG. 1A.

FIGS. 1A and 1B schematically show an optoelectronic device 10 in a top view and a side view, respectively. The structure and operation of the optoelectronic device 10 are described below.

The optoelectronic device 10 includes an arrangement 11 comprising a plurality of emitter elements 12 and an arrangement 13 comprising a plurality of time-of-flight detector elements 14. Furthermore, an evaluation unit and a control unit are integrated in an integrated circuit 15.

The arrangement 11 with the emitter elements 12 is mounted on the integrated circuit 15, which is arranged together with the arrangement 11 in a first cavity. The arrangement 13 with the time-of-flight detector elements 14 is arranged in a second cavity. In the present embodiment, the time-of-flight detector elements 14 are the pixels of a CMOS time-of-flight camera chip. A camera lens 16 is arranged above the arrangement 13 as a lens.

During operation of the optoelectronic device 10, the emitter elements 12 sequentially emit light of different wavelengths or wavelength ranges. In the arrangement 11, each of the emitter elements 12 emits light at a wavelength or in a wavelength range that is different from the wavelength or wavelength range of the light emitted by the remaining emitter elements 12.

The light emitted by the emitter elements 12 is at least partially incident on a sample 17, the contents of which are to be examined by means of the optoelectronic device 10. A portion of the light is reflected from the sample to the camera lens 16. The light passes through the camera lens 16 and falls on the time-of-flight detector elements 14. The outlined path of the light is illustrated by arrows 18 and 19 in FIG. 1B.

Each of the time-of-flight detector elements 14 measures the intensity of light incident on the respective time-of-flight detector element 14. Furthermore, each of the time-of-flight detector elements 14 performs a measurement which allows to determine the distance between the reflection point of the light at the sample 17 and the respective time-of-flight detector element 14.

Figure 2A:
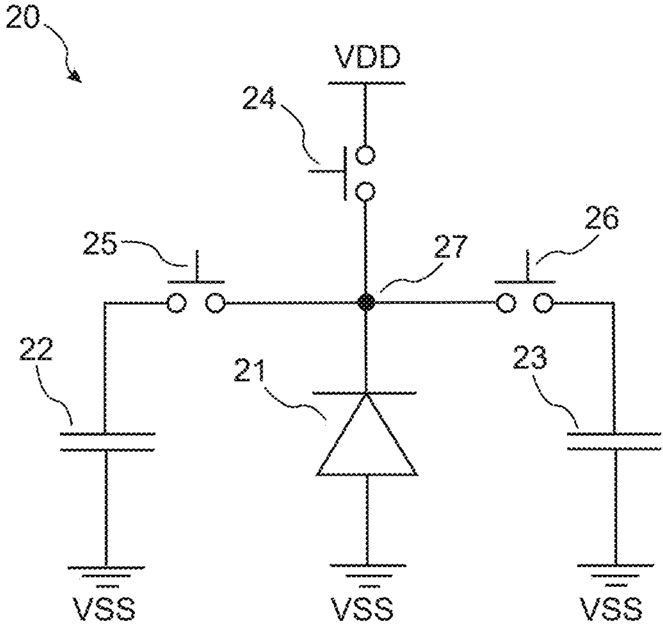
FIG. 2A an equivalent circuit diagram of a time-of-flight detector pixel.

The time-of-flight detector elements 14 may be, for example, CMOS detector pixels 20 that operate according to so-called quadrature modulation. The equivalent circuit of a detector pixel 20 is shown in FIG. 2A.

The detector pixel 20 includes a photodiode 21 and two capacitors 22 and 23, each of which can be connected between a supply voltage VDD and a ground VSS by means of switches 24 to 26. Switch 24 is connected between the supply voltage VDD and a common node 27. Switches 25 and 26 are connected between the common node 27 and capacitors 22 and 23, respectively.

Figure 2B:
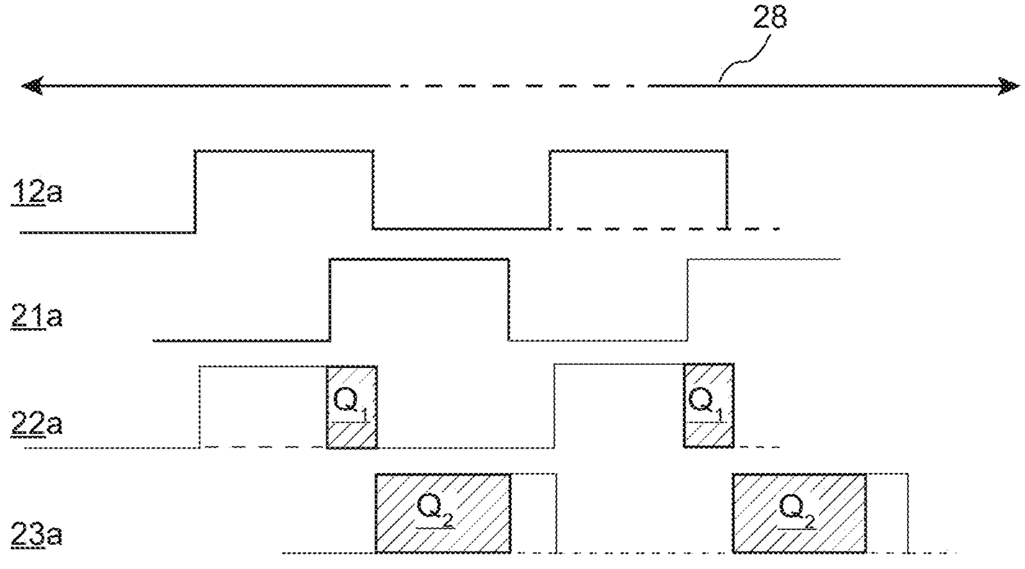
FIG. 2B an illustration of the operation of the time-of-flight detector pixel of FIG. 2A.

The operation of the detector pixel 20 is shown schematically in FIG. 2B. The control unit included in the integrated circuit 15 controls the emitter elements 12 such that an emitter element 12 periodically emits light at a predetermined wavelength or range of wavelengths, as shown in waveform signal 12*a* in the first line of FIG. 2B. The capacitor 22 is connected to the photodiode 21 during the time that the emitter element 22 emits light, and is disconnected from the photodiode 22 during the rest of the time. In the case of the capacitor 23, the reverse is true, i.e., the capacitor 23 is connected to the photodiode 21 between two successive pulses emitted by the emitter element 12 and is disconnected from the photodiode 21 during the light emission by the emitter element 12. To accomplish this, the control unit controls switches 25 and 26 such that switch 25 is closed during a light pulse and otherwise open, and switch 26 is closed between successive light pulses and otherwise open. Switch 24 is controlled by the control unit such that it is closed during the complete measurement process.

Based on the above, capacitor 22 is charged by photodiode 21 during the emission of one light pulse, while capacitor 23 is charged by photodiode 21 between the emission of two successive light pulses.

Since the light emitted from the emitter element 12 is first reflected from the sample 17, it reaches the photodiode 21 with a certain time delay, as shown in waveform signal 21*a* in the second row of FIG. 2B. This time delay causes capacitor 22 to be periodically charged with an amount of charge Q1 (see e.g., waveform signal 22*a*), while capacitor 23 is periodically charged with an amount of charge Q2 (see e.g., waveform signal 23*a*). The charges Q1 and Q are integrated over a predetermined time period 28. Using the ratio of the charges accumulated in the capacitors 22 and 23 during the time period 28, the evaluation unit included in the integrated circuit 15 can determine the time offset of the reflected light pulse and, from this, the distance of the respective detector pixel 20 from the reflection point on the sample 17. In particular, the distance of the emitter elements 12 from the sample 17 is known.

Consequently, for each wavelength or wavelength range emitted by the emitter elements 12, the evaluation unit has available both the light intensity of the reflected light detected by the time-of-flight detector elements 14 and the distance of the respective time-of-flight detector element 14 from the reflection point on the sample 17. From these data, the evaluation unit generates a spatially three-dimensional image of the sample 17 for each wavelength or range of wavelengths emitted by the emitter elements 12.

Figure 3:
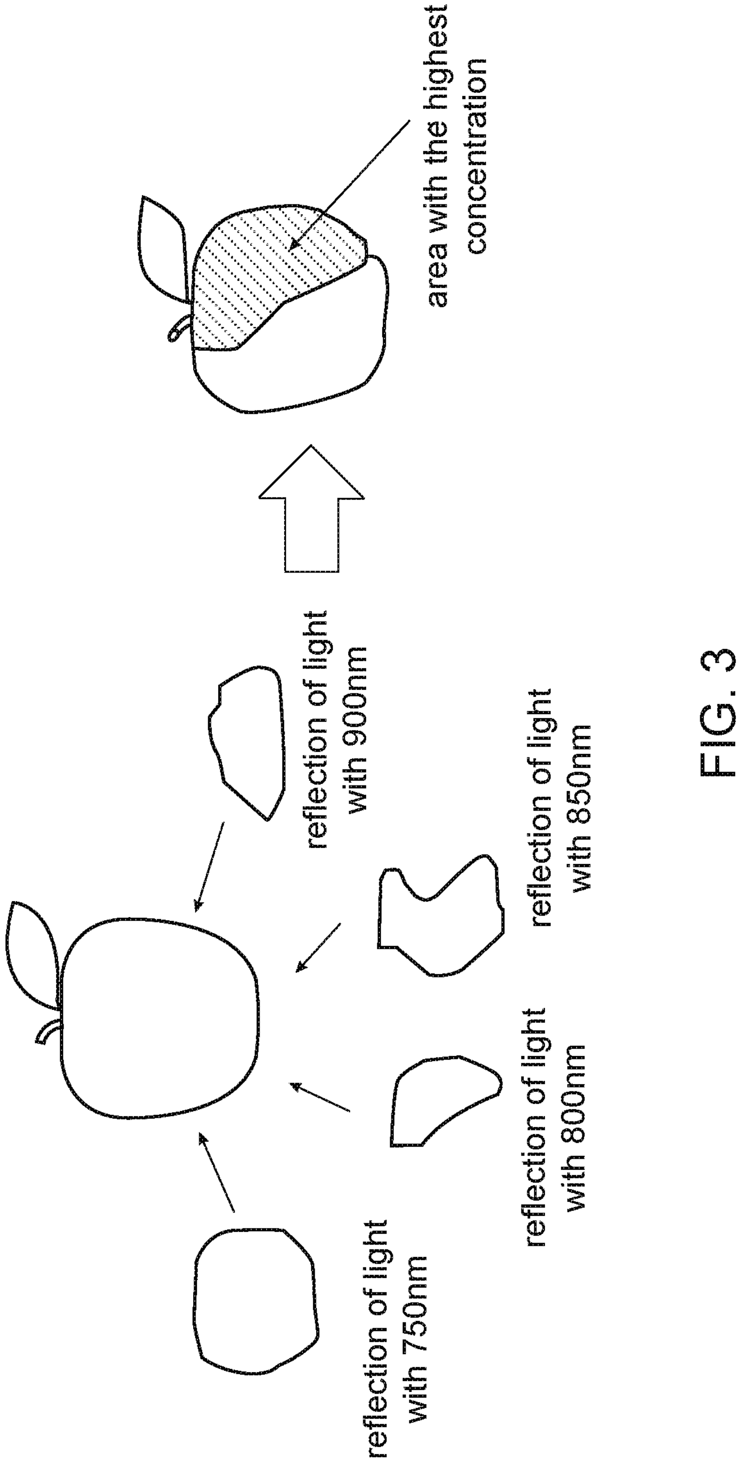
FIG. 3 illustrations of three-dimensional reflectance images of an apple and a representation of the distribution of a substance in the apple.

As an example, FIG. 3 shows four three-dimensional reflection images of an apple as sample 17. The four reflection images were taken with light of wavelengths 750 nm, 800 nm, 850 nm and 900 nm. In the present example, the distribution of a substance in the apple is to be investigated, which has an absorption maximum at approximately 850 nm. Consequently, light with this wavelength is strongly absorbed and therefore only slightly reflected, whereas light with other wavelengths is more strongly reflected.

The absorption spectrum of the substance to be examined or at least a portion of the absorption spectrum is stored in a memory unit to which the evaluation unit has access. With the help of the absorption spectrum and the four three-dimensional reflection images of the apple, the evaluation unit can generate a three-dimensional representation shown in FIG. 3 on the right, which shows the distribution of the substance in the apple. In the representation of FIG. 3, the area with the highest concentration of the substance under investigation is indicated.

Figures 4A, 4B, 4C:
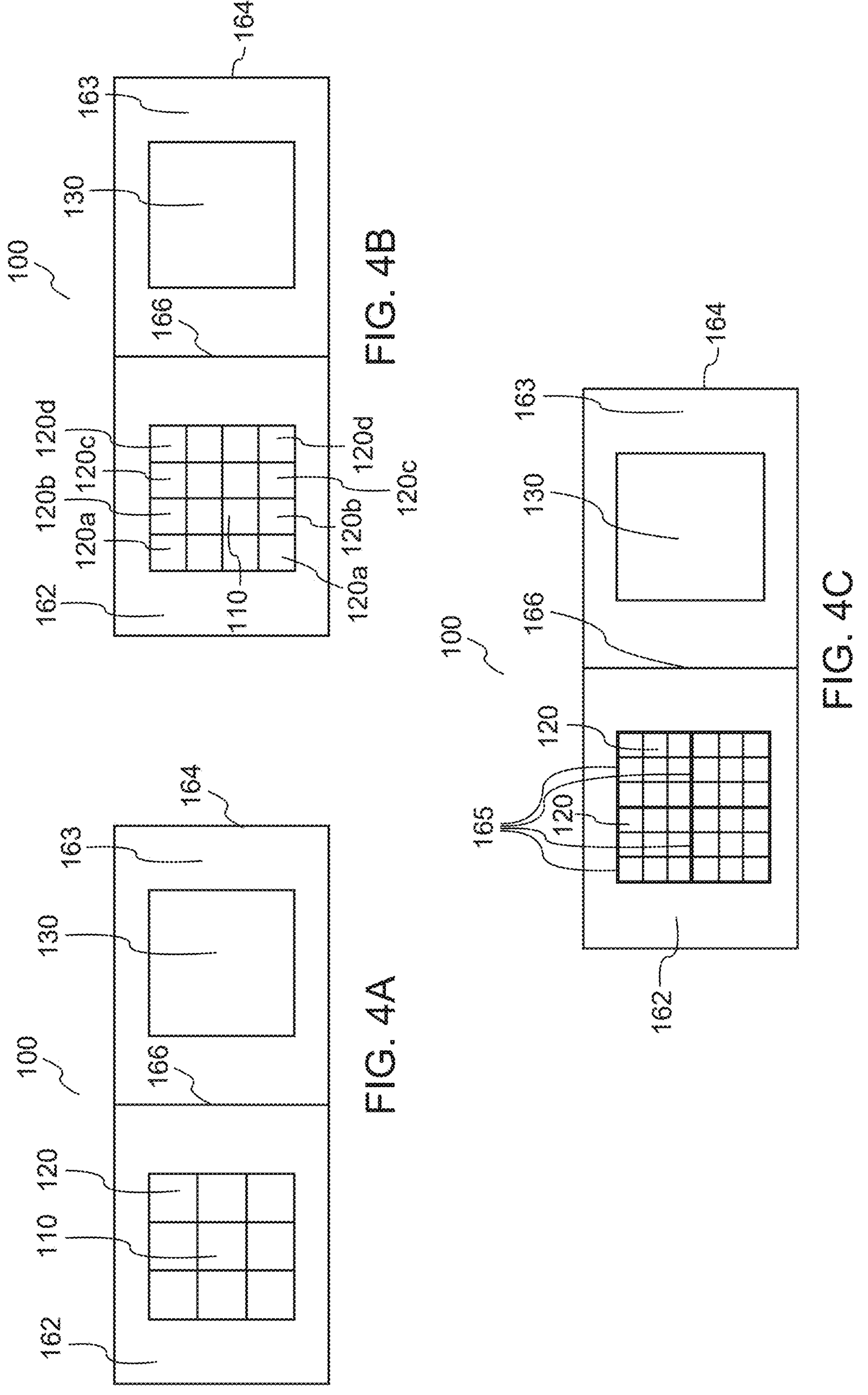
FIGS. 4A to 4C illustrations of further embodiments of an optoelectronic device in a top view.
Figure 5:
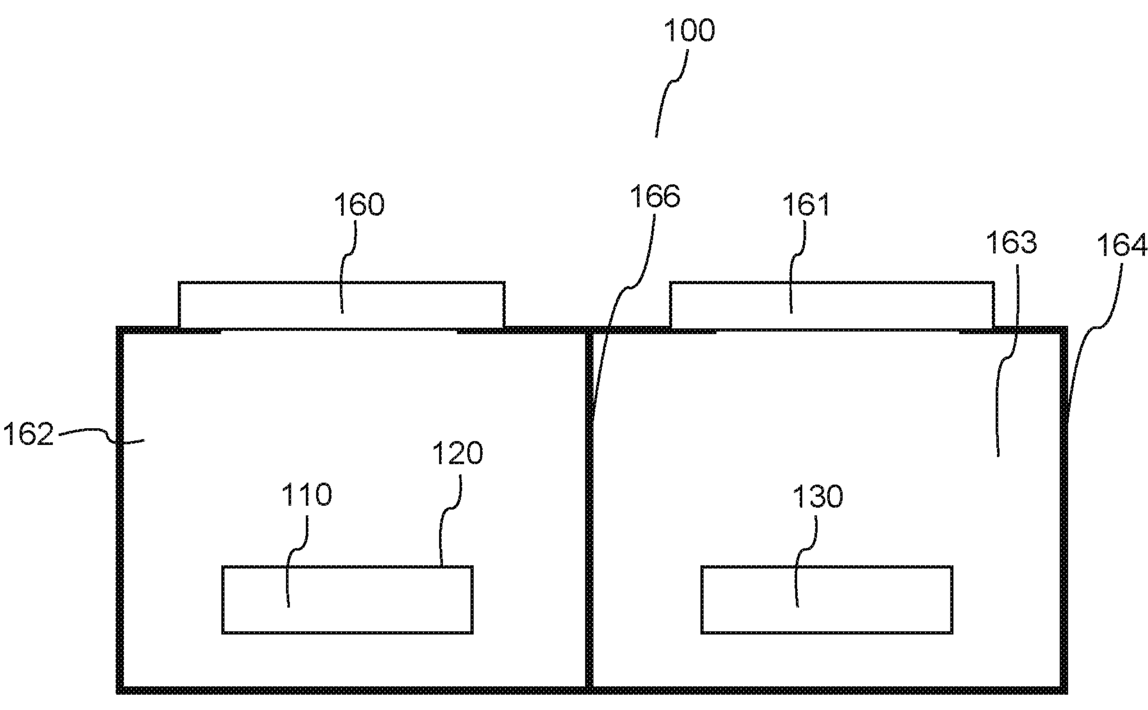
FIG. 5 an illustration of an optoelectronic device in a side view.

FIGS. 4A to 4C schematically show three embodiments of an optoelectronic device 100 in a top view. FIG. 5 schematically shows an optoelectronic device 100 in a side view. The structure and operation of the optoelectronic device 100 are described below.

The optoelectronic device 100 includes an arrangement 110 configured as an array comprising a plurality of emitter elements 120, and an arrangement 130 comprising a plurality of detector elements. In this regard, the arrangement of the plurality of detector elements is shown only as a block comprising multiple detector elements (not shown). The detector elements may be formed, for example, by the pixels of a CMOS camera chip.

The arrangement 110 with the emitter elements 120 is arranged in a first cavity 162. The arrangement 130 with the detector elements is arranged in a second cavity 163. The two cavities are separated from each other by a partition wall 166, in particular optically separated from each other. The two cavities and the partition wall 166 are formed by a housing 164, in which the arrangement 110 with the emitter elements 120 and the arrangement 130 with the detector elements are arranged. Furthermore, an evaluation unit not shown here and a control unit may also be arranged in the housing 164.

During operation of the optoelectronic device 100, the emitter elements 120 sequentially emit light of different wavelengths or wavelength ranges at least partially onto a sample. For example, an optical lens 160 in front of the plurality of emitter elements may be configured to project the light emitted by the emitter elements onto the sample to be examined. The optoelectronic device 100 can then be used to examine constituents of the sample. A portion of the light is reflected from the sample to a further optical lens 161. The light passes through the further optical lens 161 and falls on the arrangement 130 comprising the detector elements. The further optical lens 161 in front of the plurality of detector elements may be configured to image the image of the sample under investigation, in particular the light reflected from the sample under investigation, onto the detector elements. Each of the detector elements then measures the intensity of the light falling on the respective detector element.

Referring to FIG. 4A, in the arrangement 110, each of the emitter elements 120 emits light at a wavelength or in a wavelength range that is different from the wavelength or wavelength range of the light emitted by the other emitter elements 120.

In contrast, the arrangement 110 shown in FIG. 4B also comprises emitter elements 120*a*, 120*b*, 120*c*, 120*d* that emit light at the same wavelength or in the same wavelength range, respectively.

As shown in FIG. 4C, the arrangement 110 comprises four segments 165 of emitter elements 120, each of the emitter elements 120 of each segment 165 emitting light at a wavelength or in a wavelength range that is different from the wavelength or wavelength range of the light emitted by the other emitter elements 120 of the segment 165.

According to FIG. 5, the housing 164 comprises an opening above the two cavities 162, 163, on each of which one of the two optical lenses 160, 161 is arranged. The housing comprises a circumferential step in the housing for mounting the two optical lenses 160, 161, in which the two optical lenses 160, 161 are inserted. As shown in FIG. 5, the partition wall 166 is part of the housing 164 and, in particular, may be of the same material as the housing and integral therewith. In particular, the partition wall 166 optically separates the first cavity 162 with the arrangement 110 with the emitter elements 120 arranged therein from the second cavity 163 with the arrangement 130 with the detector elements arranged therein.

LIST OF REFERENCE SIGNS

- 10 optoelectronic device
- 11 arrangement
- 12 emitter element
- 12*a* waveform signal
- 13 arrangement
- 14 Time-of-Flight Detector Element
- 15 integrated circuit
- 16 camera lens
- 17 sample
- 18 arrow
- 19 arrow
- 20 CMOS detector pixel
- 21 photodiode
- 21*a* waveform signal
- 22 capacitor
- 22*a* waveform signal
- 23 capacitor
- 23*a* waveform signal
- 24 switch
- 25 switch
- 26 switch
- 27 node
- 28 period
- 100 optoelectronic device
- 110 arrangement
- 120 emitter element
- 120*a* emitter element
- 120*b* emitter element
- 120*c* emitter element
- 120*d* emitter element
- 130 arrangement
- 160 optical lens
- 161 optical lens

162 first cavity
163 second cavity
164 housing
165 segment
166 partition wall

The invention claimed is:

1. An optoelectronic device comprising:

a plurality of emitter elements configured to sequentially emit light of different wavelength ranges;

a plurality of detector elements each configured to detect an intensity of the light emitted by the plurality of emitter elements and reflected from a sample and also determine a distance of a reflection point of the light from the sample to the respective detector element for each light of the different wavelength ranges;

wherein the plurality of emitter elements and the plurality of detector elements are arranged in a common housing, wherein the plurality of emitter elements is arranged in a first cavity in the housing and the plurality of detector elements is arranged in a second cavity in the housing, and wherein the first cavity and the second cavity are optically separated from each other by a partition wall; and at least one processor, and at least one memory storing instructions, the at least one memory and the instructions configured to, with the at least one processor, cause the optoelectronic device to generate a single three-dimensional image of the sample in response to each light of the different wavelength ranges emitted by the plurality of emitter elements based on the intensity of light detected and the distance to the reflection point determined at each of the plurality of the detector elements for each light of the different wavelength range and to determine an overall image of the sample based on each of the single three-dimensional images, each single three-dimensional image corresponding to a respective wavelength range of the different wavelength ranges, the overall image comprising a plurality of image points, each of which comprises a superposition of each light of the different wavelength ranges reflected from the sample and detected by a detector element of the plurality of detector elements corresponding to the respective image point.

2. The optoelectronic device according to claim 1, wherein the partition wall comprises a same material as the housing.

3. The optoelectronic device according to claim 1, wherein the optoelectronic device is configured as a lead-frame package, ceramic package, or chip-size package.

4. The optoelectronic device according to claim 1, wherein an optical lens is arranged in front of the detector elements and/or in front of the plurality of emitter elements.

5. The optoelectronic device according to claim 1, wherein the plurality of emitter elements are configured to emit light in the infrared spectral region.

6. The optoelectronic device according to claim 1, wherein the plurality of emitter elements are configured to emit broadband light, and wherein a wavelength filter is arranged above each of the emitter elements.

7. The optoelectronic device according to claim 1, wherein at least two emitter elements of the plurality of emitter elements are configured to emit light having the same wavelength.

8. The optoelectronic device according to claim 7, wherein a wavelength converter is arranged between at least one of the at least two emitter elements and the sample; wherein the wavelength converter is configured to convert the light emitted by the emitter element.

9. The optoelectronic device according to claim 1, wherein electrical connections for the plurality of emitter elements and the plurality of detector elements are formed on a bottom side of the optoelectronic device.

10. The optoelectronic device according to claim 1, wherein the at least one processor is further configured to control the plurality of emitter elements and the plurality of detector elements.

11. The optoelectronic device according claim 1, wherein the plurality of emitter elements are arranged in a two-dimensional array and the plurality of detector elements are arranged in a two-dimensional array.

12. The optoelectronic device according claim 1, wherein each of the plurality of detector elements comprises:

a first capacitor and a second capacitor, each of which is connected between a supply voltage connection and a ground connection by a first switch and a second switch, respectively; and a photodiode connected between the supply voltage connection and the ground connection by a third switch, wherein the first switch, the second switch, the third switch and the photodiode are connected to a common node, wherein the first switch is configured to connect the first capacitor to the photodiode only during a time that a respective emitter element emits a light pulse, wherein the second switch is configured to connect the second capacitor to the photodiode only during a time that the respective emitter element is not emitting the light pulse, and wherein the third switch is configured to connect the common node to the supply voltage connection only during a measurement period.

13. The optoelectronic device according claim 12, wherein during the measurement period, the first capacitor is configured to be periodically charged with a first amount of charge, the second capacitor is configured to be periodically charged with a second amount of charge, the first amount of charge and the second amount of charge are integrated over the measurement period, and the respective distance of the reflection point of the light from the sample to the respective detector element is determined based a ratio of the accumulated first amount of charge to the accumulated second amount of charge over the measurement time period.

14. An optoelectronic device comprising:

a plurality of emitter elements configured to sequentially emit light of different wavelength ranges;

a plurality of time-of-flight detector elements each configured to detect an intensity of the light emitted by the plurality of emitter elements and reflected from a sample and also to determine a distance of a reflection point of the light from the sample to the respective time-of-flight detector element for each light of the different wavelength ranges; and at least one processor, and at least one memory storing instructions, the at least one memory and the instructions configured to, with the at least one processor, cause the optoelectronic device to generate a three-dimensional image of the sample for the light of each wavelength range emitted by the plurality of emitter elements based on the intensity of light detected and the distance to the reflection point determined at each of the plurality of the time-of-flight detector elements for each light of the different wavelength ranges, and to determine the distribution of a substance in the sample from the three-dimensional images.

15. The optoelectronic device according to claim 14, wherein at least a portion of an absorption spectrum of the substance is stored in the at least one memory, and wherein the at least one processor is further configured to determine the distribution of the substance in the sample from the three-dimensional images using the at least a portion of the absorption spectrum.

16. The optoelectronic device according to claim 14, wherein the plurality of emitter elements is arranged in a first cavity and the plurality of time-of-flight detector elements is arranged in a second cavity.

17. The optoelectronic device according to claim 14, the at least one processor further configured to control the plurality of emitter elements and the plurality of time-of-flight detector elements.

18. The optoelectronic device according to claim 14, wherein the light sequentially emitted by the plurality of emitter elements of different wavelength ranges comprises light from the near-infrared spectral range.

19. The optoelectronic device according to claim 14, wherein at least one optical lens is arranged in front of the plurality of time-of-flight detector elements.

20. A method for determining the distribution of a substance in a sample, wherein the method comprises:

sequentially emitting light of different wavelength ranges via a plurality of emitter elements, wherein the light emitted by the emitter elements is reflected from a sample;

detecting an intensity of the light reflected from the sample by each of a plurality of time-of-flight detector elements for each light of the different wavelengths;

determining a distance of a reflection point of the light from the sample to a respective time-of-flight detector element by each of the plurality of time-of-flight detector elements for each light of the different wavelengths;

generating a three-dimensional image of the sample, for the light of each wavelength range emitted by the plurality of emitter elements, based on the intensity of light detected and the distance to the reflection point determined at each of the plurality of the time-of-flight detector elements for each light of the different wavelength ranges; and determining the distribution of a substance in the sample from the three-dimensional images.

* * * * *